United States Patent
Cox

[11] Patent Number: 5,090,835
[45] Date of Patent: Feb. 25, 1992

[54] PICTURE FRAME CONNECTING SYSTEM

[76] Inventor: Eugene J. Cox, 9632 Farr La., Richmond, Va. 92325

[21] Appl. No.: 453,065

[22] Filed: Dec. 11, 1989

[51] Int. Cl.⁵ .............................................. F16B 7/00
[52] U.S. Cl. ........................................................ 403/294
[58] Field of Search ............................ 403/292–295, 403/298, 401–403, 231, 205, 382, 381; 40/155

[56] References Cited

U.S. PATENT DOCUMENTS

| | | |
|---|---|---|
| 111,128 | 1/1871 | Linscott . |
| 497,915 | 5/1893 | Fulghum . |
| 1,537,678 | 5/1925 | Jensen . |
| 2,378,562 | 6/1945 | Lahr .............................. 403/294 X |
| 2,735,146 | 2/1956 | Purviance ........................ 403/294 |
| 3,336,689 | 8/1967 | Miller . |
| 3,425,721 | 2/1969 | Agee .............................. 403/294 |
| 3,603,053 | 9/1971 | Loghem ........................ 403/292 X |
| 4,142,342 | 3/1979 | Jungers et al. ................ 403/294 X |
| 4,262,973 | 4/1981 | Grilli et al. .................... 403/294 X |
| 4,275,972 | 6/1981 | Bowen et al. ................. 403/231 X |
| 4,290,371 | 9/1981 | Snitzer et al. ................ 403/294 X |
| 4,493,583 | 1/1985 | Wallace ........................ 403/295 X |
| 4,632,589 | 12/1986 | Hsiu ............................... 403/381 X |
| 4,913,579 | 4/1990 | Campana ....................... 403/298 X |

FOREIGN PATENT DOCUMENTS

| | | |
|---|---|---|
| 6911154 | 1/1871 | Fed. Rep. of Germany . |
| 2515638 | 6/1976 | Fed. Rep. of Germany ...... 403/402 |
| 7502221 | 8/1976 | Netherlands .................... 403/381 |
| 743332 | 1/1956 | United Kingdom ............. 403/401 |
| 1358863 | 7/1974 | United Kingdom ............. 403/401 |

Primary Examiner—Peter M. Cuomo
Attorney, Agent, or Firm—Darby & Darby

[57] ABSTRACT

A plurality of frame members adapted to be joined one to another in a picture frame configuration. End portions of the frame members have "T" shaped slots, with adjacent slots comprising a combined "H" shaped recess. There are matching "H" shaped connectors which fit into pairs of adjacent slots to form the picture frame. The relative dimensions of the connector and the recesses are arranged so that limited rotational movement between adjacent end portions of the frame members are permitted so as to accommodate irregularities or skewing in the frame members.

20 Claims, 3 Drawing Sheets

FIG. 1
FIG. 2
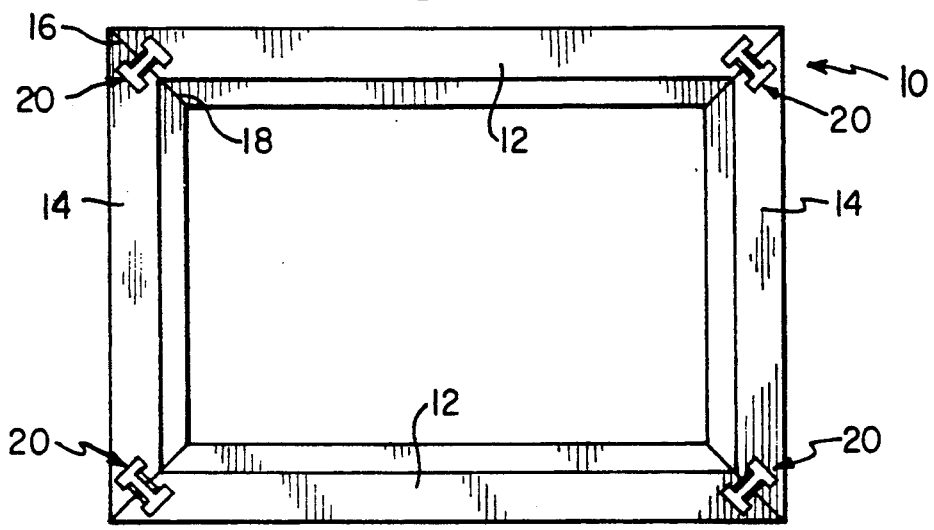
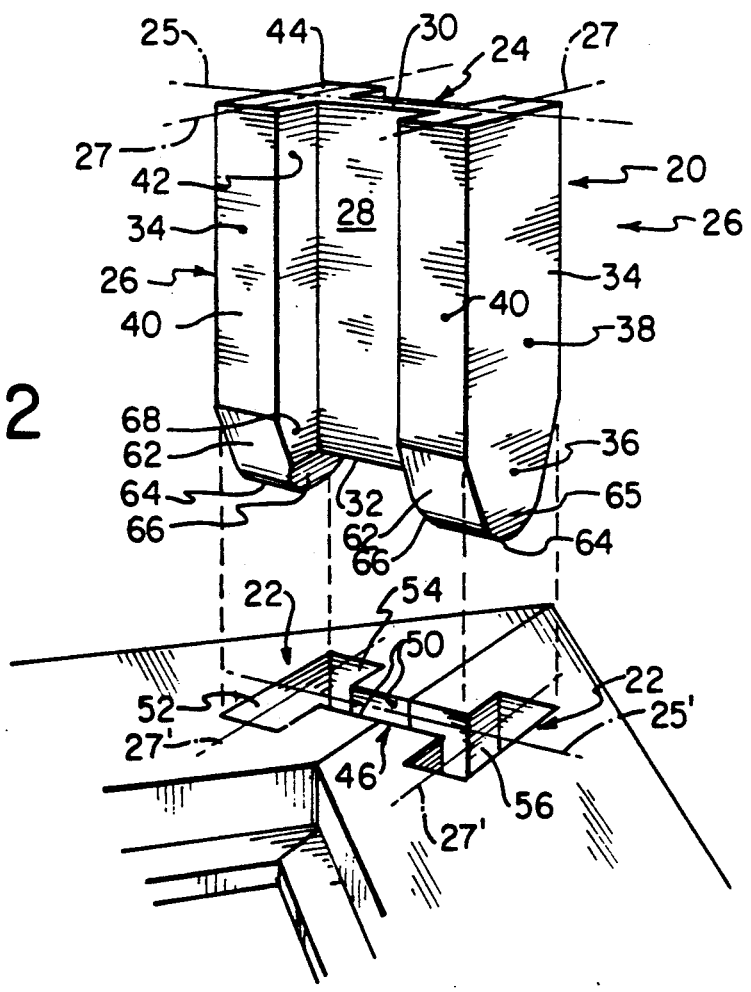

PICTURE FRAME CONNECTING SYSTEM

This is a continuation of application Ser. No. 109,481, filed Oct. 16, 1987, abandoned.

BACKGROUND OF THE INVENTION

1. Field of the Invention

The present invention relates to a system for connecting the frame members of a picture frame, and more particular to such a system which is particularly adapted to accommodate irregularities in the frame members.

2. Background Art

Picture frames are commonly assembled from four elongate frame members having connecting mitred end portions. A traditional method of securing the frame members to one another is to apply glue to the mitred end surfaces and clamp the frame members together until the bonding agent holds the members securely to one another. However, this is a somewhat time consuming operation, and generally specialized equipment is required to utilize this method effectively.

Accordingly, there have been various approaches in the prior art to use mechanical connecting devices to join the frame members together. In general, some sort of recesses or slots are formed in the adjacent end portions of two frame members, and a connecting device of a configuration generally matching the recesses is placed into the adjacent recesses in a manner to hold those end portions together.

A search of the U.S. patents has revealed a number of such devices, these being the following:

U.S. Pat. No. 4,509,882—Lautenschalger shows such a connecting device having a dumbbell shaped configuration. One portion of the connecting device has an eccentric section, so that rotation of that portion causes the two parts of the fastener to be drawn together to make a tight joint.

U.S. Pat. No. 4,493,583—Wallace shows a connector with two leg portions which meet each other at a right angle, and two end enlargements. This connector fits into similarly shaped grooves in the end portions of the frames. The lower edge portions of this connector have the side surfaces tapered inwardly.

U.S. Pat. No. 4,275,932—Bowen et al shows a connector having an "H" or "I" configuration. The middle portion of the fastener has a box like configuration, and there is a tightening screw which has the effect of drawing the two end fastening elements together to make a tighter connection.

U.S. Pat. No. 3,425,721—Agee shows a dumbbell shaped fastener for joining the mitred corners. The two sections of the matching recess slant away from each other in a downward direction so that insertion of the connector draws the frame members more closely to one another.

U.S. Pat. No. 1,537,678—Jensen discloses an "I" shaped joining device. This device is constructed of flanged channel shaped members.

U.S. Pat. No. 1,165,155—Cordes discloses another form of a dumbbell shaped joining device.

U.S. Pat. No. 1,061,855—Lobo shows another connecting device having a dumbbell configuration, where the end portions of the connector are rolled portions.

U.S. Pat. No. 497,915—Fulghum et al shows a connector where there is a dumbbell shape, with the end portions of the connector fitting into tapered recesses.

U.S. Pat. No. 111,128—Linscott discloses another joining device where there are end enlargements having a slanted configuration.

It is an object of the present invention to provide a fastening device particularly adapted for joining framing members of a picture frame to one another, with the fastening device being well adapted to accommodate irregularigies and/or deviations in the frame members, for example, where the frame members might be slightly warped along the lengthwise axis of the frame member.

SUMMARY OF THE INVENTION

The picture frame connecting system of the present invention comprises a plurality of frame members adapted to be joined one to another in a picture frame configuration. Each frame member has end portions with mitred end surfaces with the frame members being adapted to be positioned with the end surfaces of adjacent end portions positioned against one another at a related inner location.

The end portions of the frame members each are formed with a recess. There is a leg recess portion which has an inner end that opens to the end surface of the related end portion and an outer end. Leg recess surface portions extend along a leg axis and define the leg recess portion.

There is also a cross recess portion which has a lengthwise cross axis which extends generally transversely to the leg axis. The cross recess portion connects to the outer end of the leg recess portion and extends laterally therefrom. This cross recess portion has a first inwardly positioned recess surface portion which extends laterally from the leg recess portion, a second outwardly positioned recess surface portion facing said first recess surface portion, and third and fourth oppositely positioned side recess surface portions.

The recess is configured in a manner that the side leg recess surface portions are spaced from one another by a first leg width recess dimension, and the third and fourth side surface portions are spaced from one another by a second cross recess transverse dimension.

The recesses of adjacent end portions of two frame members are positioned in a manner that with the two frame members in the frame configuration, the leg recess portions of the adjacent end portions are positioned adjacent to one another to form a connecting recess area made up of the leg recess portions of the adjacent end portions.

There is at least one connecting member adapted to fit into a pair of adjacent recesses. The connecting member comprises a leg member configured to fit into the connecting recess area and two cross members configured to fit into the cross recess portions of the adjacent recesses.

The leg member has side surfaces and a leg width dimension which is equal to a distance between the side surfaces of the leg member. Each cross member has two side surfaces spaced transversely from one another by a transverse cross member dimension.

The leg width dimension is less than the first leg width recess dimension by a predetermined leg dimension gap. The second cross recess dimension is greater than the transverse cross member dimension by a predetermined cross dimension gap. The leg dimension gap and cross dimension gap are sufficiently great so that with the connector being positioned in the adjacent recesses, the end portions of the frame member in which the adjacent recesses are formed can have limited rotational movement with respect to one another along a plane defined by the adjacent end surface portions of the two end members.

In the preferred form, the first inwardly positioned recess surface portions of each of the adjacent recesses are planar surfaces parallel with the end surfaces. Further, the cross recess portion of each recess extends transversely in opposite directions from the leg recess portion, whereby each recess has a generally "T" shaped configuration.

Desirably, each cross member has an inwardly positioned and inwardly facing surface portion adapted to engage the first inwardly positioned recess surface portion. A lower end of the inwardly positioned and inwardly facing surface portion of the cross member is slanted outwardly in a downward direction. Also, the lower surface portions of the two side surface portions of each cross member extend downwardly and toward one another at a slant.

In the preferred configuration, the leg member has a lower end portion which is spaced upwardly from lower end portions of the two cross members.

The second cross recess transverse dimension is in the preferred form at least about one-twentieth greater than the transverse cross member dimension.

The invention further comprises a connector for use in the system as described above, this connector having the characteristics as indicated above.

Other features of the invention will become apparent from the following detailed description.

BRIEF DESCRIPTION OF THE DRAWINGS

FIG. 1 is a back view of an assembled picture frame incorporation the system of the present invention;

FIG. 2 is a view showing the mitred end portions of two frame members positioned one against the other, with a connector of the system of the present invention about to be inserted in adjacent recesses in the end members;

DETAILED DESCRIPTION OF THE PREFERRED EMBODIMENT

Figure 3:
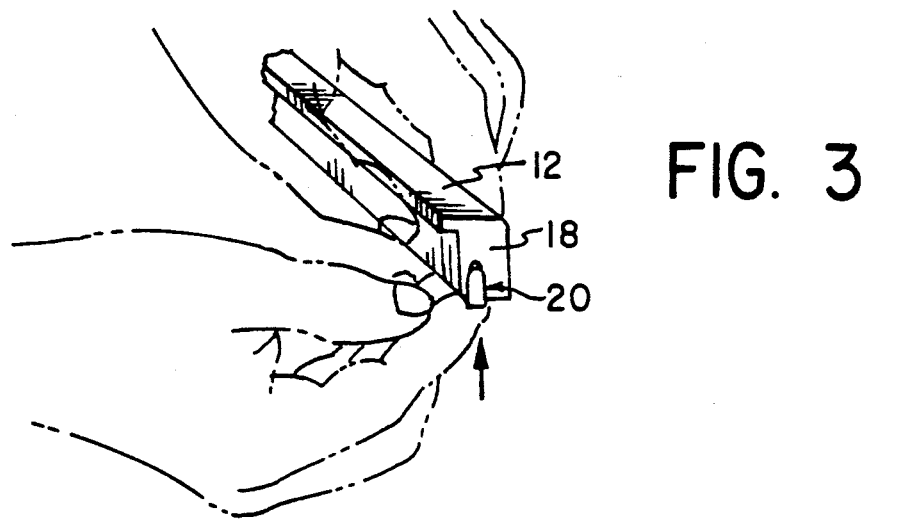
FIGS. 3, 4 and 5 are perspective views showing the manner in which the picture frame is assembled in accordance with the present invention.

In FIG. 1, there is shown an assembled picture frame 10 made up of four elongate frame members 12 interconnected at end portions 14 thereof, with the frame 10 having a rectangular configuration. As is customary with picture frames, the end edges 16 are mitred at the appropriate angle (as shown herein, 45°), with the end surfaces 18 of the adjacent edges 16 being positioned against one another.

The connecting system of the present invention comprises a plurality of connectors 20, and recesses 22 which are formed in the back side of the end portions 14 of the frame members 12. The configurations and relative dimensions of the connector 20 and recesses 22 are critical to obtain the benefits of the present invention.

The connector 20 is desirably made as a unitary member (e.g., made from plastic that is injection molded) and as viewed from the end has an "H" configuration. This connector 20 comprises a leg member 24 having a leg axis 25 and two end cross members 26, each having a lengthwise cross axis 27. The leg member 24 has the configuration of a right angle rectangular prism having two planar side surfaces 28, a planar top surface 30, and a bottom side surface indicated at 32.

The two cross members 26 are identical to one another, and each of these members 26 has a main body portion 34 having the configuration of a right angle rectangular prism positioned at a right angle relative to the leg member 24, and a lower tapered nose portion 36. Each cross member 26 has an exterior planar end surface 38, two vertical side surfaces 40, and two inner surface portions 42 positioned on opposite sides of the leg member 24. The two cross members 26 have planar top surfaces 44 which lie in the same plane as the top surface 30 of the leg member 24.

The aforementioned recesses 22 each has a "T" shaped configuration, comprising a leg portion 46 with a leg axis 25' and a cross portion 48 having a lengthwise cross axis 27'. The leg portion 46 has two side surfaces 50 which define the leg recess portion 46. Each cross portion 48 of the recess 22 has an end surface 52, two side surfaces 54, and two inner surfaces 56 positioned on opposite sides of the recess leg portion 46.

It can readily be seen in the accompanying drawing that in horizontal cross section the configuration of the connector 20 matches closely the horizontal cross section of two adjacent recesses 22 which in effect form a combined "H" shaped recess 22—22 when the two end portions 14 are positioned against one another. The two leg recess portions 46 receive the leg member 24 of the connector 20, while the cross recess portions 48 each receive a related one of the cross members 26 of the connector 20.

Figure 6:
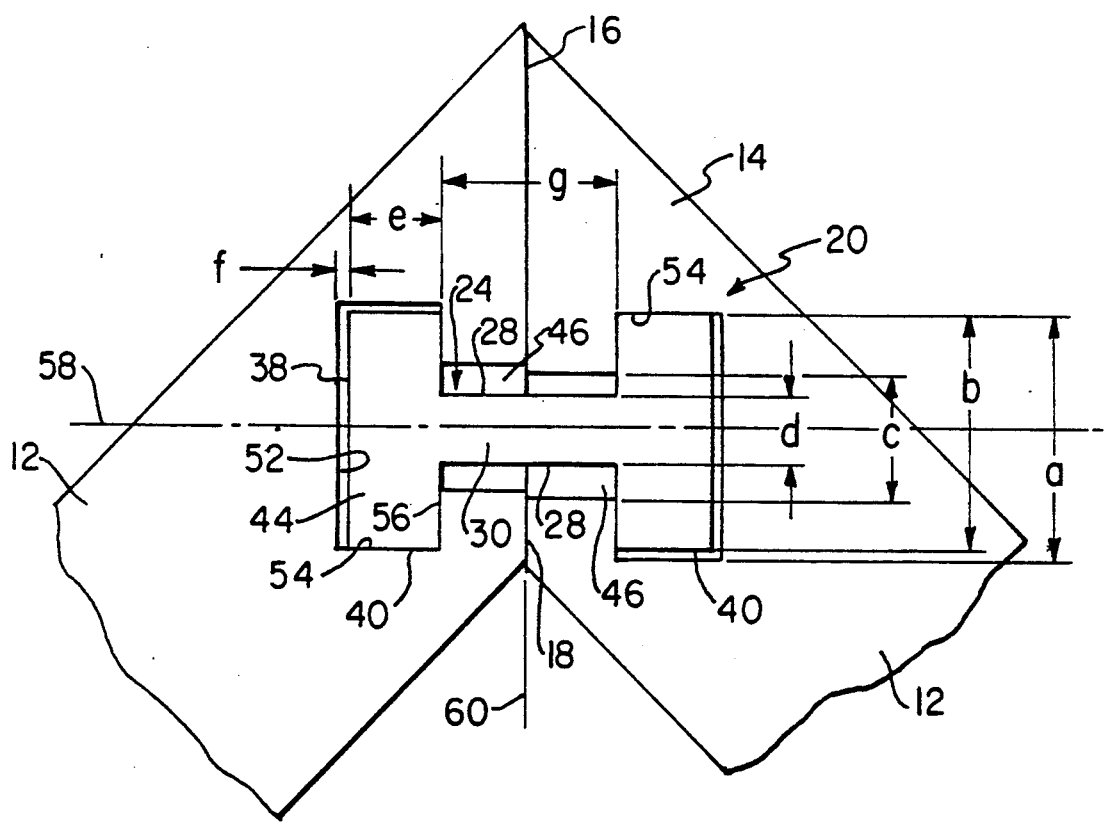
FIG. 6 is an enlarged back view of adjacent end portions of two frame members held together by the connector, and illustrating certain critical dimensions.

With reference to FIG. 6, for purposes of description, the connector 20 will be considered as having a longitudinal axis 58 extending between, and perpendicular to, the two end surfaces 38 so as to be equally distant between the two side surfaces 28 of the leg member 24, so as to be coincident with the leg axes 25. There is a transverse axis 60 which is perpendicular to the longitudinal axis 58 and parallel to the lengthwise cross axes 27. When reference is made to these axes 58 and 60 relative to the recesses 22, it is to be understood that these axes 58 and 60 would simply be located in the adjoining recesses 22-22 at the location of these axes 58 and 60 when the connector 20 is positioned in the matching recesses 22-22.

Also, for purposes of description, the term "inner" or "inward" will denote proximity to, or a direction toward, the transverse vertical plane located at the middle of the leg member 24 of the connector 20, and also proximity to, or a direction toward, the juncture plane of the end surfaces 18 of the frame member end portions 14. Likewise, the term "outer" or "outward" will denote a location further from those locations or a direction away from those locations.

The aforementioned nose portions 36 of the two cross members 26 each have side surfaces 62 which extend from the lower edges of the adjacent side surfaces 40 downwardly and at a moderate slant toward one another to terminate in a rounded end portion 64. The outer lower end surface portions 65 of the nose portion 36 are coplanar with the end surfaces 38 of the cross members 26. The lower surface portion 66 of the inside surface 68 of each nose portion 36 extends downwardly at a moderate outward slant.

Figure 4:
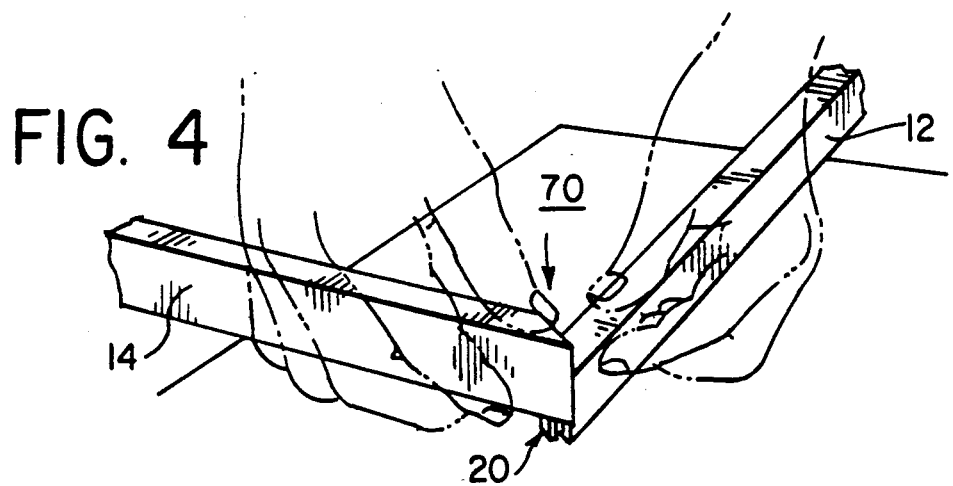
Figure 5:
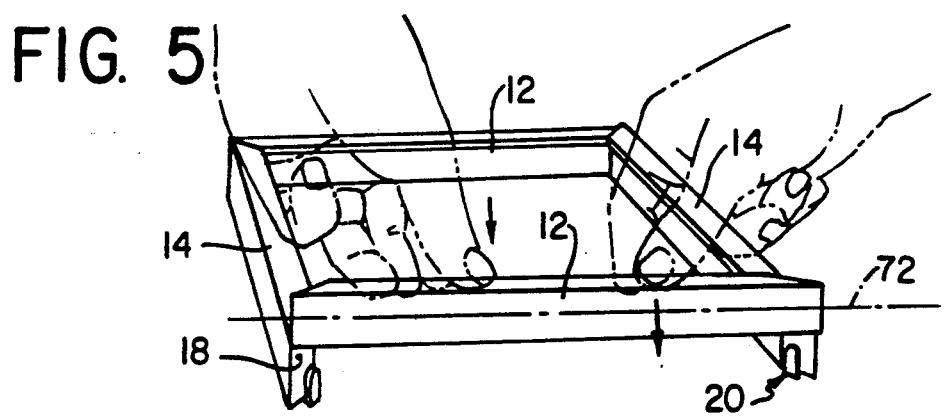

To describe the manner in which the connectors 20 are utilized to join the frame members 12 to one another, reference is now made to FIGS. 3 through 5. As illustrated in FIG. 3, the connector 20 is inserted into one of the recesses 22 of one frame member 12 with one cross member 26 fitting into the related cross recess portion 48, and with the leg member 24 extending outwardly from the leg recess portion 46.

As illustrated in FIG. 4, the back side of the frame member 12 is placed on a flat surface 70 to provide support for the connector 20, and a second frame member 12 is positioned at right angles to the first frame member 12 so that the end surfaces are adjacent to one another. Then the second frame member 12 is moved downwardly to cause the recess 22 of the second frame member 12 to come into engagement with the exposed portion of the connector 20. The final connection is made as illustrated in FIG. 5, where the fourth frame member 12 is moved in a downward direction to come into engagement with the two connectors 20.

It will be noted that the tapered configuration of the two nose portions 36 of the connector 20 facilitate the entry of the connector into the recesses 22. More specifically the inside slanted surface portions 66 are able to engage the upper edges of the inner surfaces 56 of the two recesses 22, thus causing the two end portions 18 of the frame members 12 to move more closely together in the event that there is a gap between the end surfaces 18. In like manner, the taper of the side surfaces 62 of the two nose portions 36 helps guide the connector 20 into engagement with the recesses 22 in case there is some minor misalignment during the assembling process. It will be noted that the bottom surface 32 of the leg member 24 is spaced upwardly a moderate distance from the lower end of the two nose portions 36, and this also facilitates the entry of the connector 20 into the recesses 22.

A significant feature of the present invention will now be described with reference to FIG. 6. The distance "a" between the two recess side cross surface portions 54 is moderately greater than the distance "b" between the side surface portions 40 of each cross member 26. Further, the distance "c" between the leg recess surface portions 50 is moderately greater than the width dimension "d" of the leg member 24 (i.e. the distance between the side surfaces 28).

The distance "e" between the outer surface 38 and the inner surface portions 42 of each cross member 26 is moderately greater than the distance between the outer surface 52 and the inner surface 56 of the matching recess portions, with the difference in these dimensions being indicated at "f". This is not a critical dimension, in that the width of the gap (indicated by the distance "f") does not affect the functioning of the present invention, and this gap "F" is primarily to provide clearance.

The distance "g" which is between the inner surfaces 42 of the two cross members 26 should be substantially the same as twice the distance between the end surface 18 of each member 12 and the inner cross recess surface 56. Thus, with the connector 20 in the installed position, the inner surfaces 42 of the cross members 26 of the connector 20 press against the recess surfaces 56 to hold the two frame members 12 together.

One of the problems in assembling a picture frame is that sometimes the frame members 12 are somewhat warped or skewed along a lengthwise axis of the frame member. For example, with reference to FIG. 5, the lengthwise axis is illustrated at 72. If this frame member 12 has a twist along its length, then if two of the adjacent end surfaces 18 of the skewed frame member 12 and a second frame member 12 are matched closely to one another so that the edges surrounding the surfaces 18 fit closely against one another, the other end surface 18 of the skewed frame member 12 that is to be positioned against another adjacent surface 18 of a third frame member 12 will not be able to fit properly against that other surface 18 of the third frame member. The result is that there is a tendency for the two frame members 12 that attach directly to the skewed frame member 12 to be somewhat out of alignment with one another, in that the two misaligned frame members 12 will not lie in the same plane. Sometimes compensation is made for this misalignment by forcing the frame members back into the aligned configuration. However, if this is done, there is sometimes a tendency for the frame members to spring back into the misaligned configuration so that all four frame members 12 do not lie in the same plane.

Another related consideration is that in the various prior art devices which utilize connectors that fit into slots or recesses formed in the frame members, the alignment and positioning of these recesses is generally determined or dictated by the configuration of the adjacent end portion 16 of the frame member 12. Thus, if the frame member 12 is skewed along its length, then the recesses (such as those shown at 22 in the present invention) will be somewhat misaligned with one another, even though the recesses are properly aligned relative to their releated frame end portions 16.

However, by providing the relative dimensions as described with reference to FIG. 6, some of the negative aspects of the skewed or warped frame members 12 are alleviated. With reference to FIG. 6, it can be seen that the side surface 40 of one of the cross members 26 is pressed against what is shown as the lower surface 54, as seen in FIG. 6, while the other cross member 26 is pressed against the surface 54 which is upwardly positioned in the showing of FIG. 6. Further, it can be seen that the leg recess portions 46 of the two adjacent recesses 22 are, as shown in FIG. 6, misaligned with one another. It is to be understood that this misalignment between the two leg recess portions 46 could result from the recess portions 56 being slightly angled relative to one another so that these tend to cross one another in the configuration of a very shallow "X". To explain this further, let it be assumed that the left frame member 12 (as seen in FIG. 6) is skewed so that the one end surface 18 does not match up with the adjacent end surface 18. With the system of the present invention, some degree of misalignment can be permitted to exist, and yet the connector 28 can properly perform its function of holding the end portions of the two frame members 12 snugly against one another. It has been found that this small amount of misalignment can be tolerated in that it does not significantly detract from the overall appearance of the frame, and is more than offset by being able to position the frame members 12 so that in the assembled position they lie in a single plane.

It is to be understood that while the connectors 20, in combination with the recesses 22, are quite capable of holding the frame members 12 in the assembled position to form the frame 10, a bonding agent could be applied to the surfaces 18 just prior to assembly so that after the frame is assembled, the frame members 12 become rigidly bonded to one another.

It has been found that if the dimension "a" is made about 5%, or possibly as high as 10%, greater than the distance "b", there is adequate tolerance to accommodate most irregularities in the frame members 12.

It is to be understood that various modifications could be made without departing from the basic teachings of the present invention.

What is claimed is:

1. A picture frame connecting system, comprising:
   a) a plurality of perimeter frame members adapted to be joined one to another in a picture frame configuration, each frame member having end portions with mitered end surfaces, with the frame members being adapted to be positioned with the end surfaces of adjacent end portions positioned against one another at a related inner location;
   b) said end portions each being formed with a recess comprising:
      i. a leg recess portion which has an inner end that opens to the end surface of the related end portion and an outer end, and also has side leg recess surface portions which extend along a leg axis and define said leg recess portion;
      ii. a cross recess portion which has a lengthwise cross axis which extends generally transversely to the leg axis, said cross recess portion connecting to the outer end of the leg recess portion and extending laterally therefrom, said cross recess portion having a first inwardly positioned recess surface portion which extends laterally from the leg recess portion, a second outwardly position recess surface portion facing said first recess surface portion, and third and fourth oppositely positioned side recess surface portions;
   c) said recess being configured as follows:
      i. the side leg recess surface portions being spaced from one another by a first leg width recess dimension;
      ii. the third and fourth side surface portion being spaced from one another by a second cross recess transverse dimension;
   d) the recesses of adjacent end portions of two frame members being positioned in a manner that with the two frame members in the frame configuration, the leg recess portions of the adjacent end portions are positioned adjacent to one another to form a connecting recess area made up of the leg recess portions of the adjacent end portions;
   e) at least one connecting member adapted to fit into a pair of adjacent recesses, said connecting member comprising a leg member configured to fit in the connecting recess area and two cross members configured to fit into the cross recess portions of the adjacent recesses, each cross member having an inner surface which contacts said first inwardly positioned recess surface portion during insertion;
   f) the distance between said first inwardly positioned recess surface portions when said frame members are joined being substantially equal to the distance between the inner surfaces of the two cross members;
   g) said leg member having side surfaces and a leg width dimension which is equal to a distance between said side surfaces;
   h) each cross member having two side surfaces spaced transversely from one another by a transverse cross member dimension;
   i) said leg width dimension being less than the first leg width recess dimension by a predetermined leg dimension gap, and said second cross recess dimension being greater than said transverse cross member dimension by a predetermined cross dimension gap, said leg dimension gap and said cross dimension gap being sufficiently great so that the connector positioned in the adjacent recesses permits limited rotational movement of one frame member with respect to an adjacent frame member within a plane defined by the adjacent end surface portions of the two end members while said connector firmly holds said end surface portions together, said limited rotational movement relieving any twisting stress generated along the individual frame members during insertion of said connector.

2. The system as recited in claim 1, wherein the first inwardly positioned recess surface portion of each of the adjacent recesses are planar surfaces parallel with said end surfaces.

3. The system as recited in claim 2, wherein said cross recess portion of each recess extends transversely in opposite directions from said leg recess portion, whereby each recess has a generally "T" shaped configuration.

4. The system as recited in claim 1, wherein said cross recessed portion of each recess extends transversely in opposite directions from said leg recess portion, whereby each recess has a generally "T" shaped configuration.

5. The system as recited in claim 1, wherein said inner surface of each cross member includes a lower end which is slanted outwardly in a downward direction.

6. The system as recited in claim 5, wherein lower surface portions of the two side surface portions of each cross member extend downwardly and toward one another at a slant.

7. The system as recited in claim 6, wherein the leg member has a lower end portion which is spaced upwardly from lower end portions of the two cross members.

8. The system as recited in claim 5, wherein the leg member has a lower end portion which is spaced upwardly from lower end portions of the two cross members.

9. The system as recited in claim 1, wherein the leg member has a lower end portion which is spaced upwardly from lower end portions of the two cross members.

10. The system as recited in claim 1, wherein lower surface portions of the two side surfaces of each cross member extend downwardly and toward one another at a slant.

11. The system as recited in claim 1, wherein the second cross recess transverse dimension is at least about one-twentieth greater than the transverse cross member dimension.

12. The system as recited in claim 1 wherein:
    a) the first inwardly positioned recess surface portion of each of the adjacent recessed are planar surfaces parallel with said end surfaces;
    b) said cross recess portion of each recess extends transversely in opposite directions from said leg recess portion, whereby each recess has a generally "T" shaped configuration;
    c) said inner surface of each cross member includes a lower end which is slanted outwardly in a downward direction;
    d) lower surface portions of the two side surface portions of each cross member extend downwardly and toward one another at a slant.

13. The system as recited in claim 12 wherein:
   a) the leg member has a lower end portion which is spaced upwardly from lower end portions of the two cross members;
   b) the second cross recess transverse dimension is at least about one-twentieth greater than the transverse cross member dimension.

14. A connector to be used in a picture frame connecting system where the system comprises:
   a) a plurality of perimeter frame members adapted to be joined one to another in a picture frame configuration, each frame member having end portions with mitered end surfaces, with the frame members being adapted to be positioned with the end surfaces of adjacent end portions positioned against one another at a related inner location;
   b) said frame members being characterized in that said end portions have a recess, comprising:
      i. a leg recess portion which has an inner end that opens to the end surface of the related end portion and an outer end, and also has side leg recess surface portions which extend along a leg axis and define said leg recess portion;
      ii. a cross recess portion which has a lengthwise cross axis which extends generally transversely to the leg axis, said cross recess portion connecting to the outer end of the leg recess portion and extending laterally therefrom, said cross recess portion having a first inwardly positioned recess surface portion which extends laterally from the leg recess portion, a second outwardly positioned recess surface portion facing said first recess surface portion, and third and fourth oppositely positioned side recess surface portions;
   c) said recess being configured as follows:
      i. the side leg recess surface portions being spaced from one another by a first leg width recess dimension;
      ii. the third and fourth side surface portions being spaced from one another by a second cross recess transverse dimension;
   d) the recesses of adjacent end portions of two frame members being positioned in a manner that with the two frame members in the frame configuration, the leg recess portions of the adjacent end portions are positioned adjacent to one another to form a connecting recess area made up of the leg recess portions of the adjacent end portions;
   e) at least one connecting member adapted to fit into a pair of adjacent recesses, said connecting member comprising:
      a) a leg member configured to fit in the connecting recess area; and
      b) two cross members configured to fit into the cross recess portions of the adjacent recesses, each cross member having an inner surface which contacts said first inwardly positioned recess surface portion during insertion, wherein the distance between said first inwardly positioned recess surface portions when said frame members are joined being substantially equal to the distance between the inner surfaces of the two cross members;
   c) said leg member having side surfaces and a leg width dimension which is equal to a distance between the side surfaces;
   d) each cross member having two side surfaces spaced transversely from one another by a transverse cross member dimension;
   e) said leg width dimension being less than the first leg width recess dimension by a predetermined leg dimension gap, and said second cross recess dimension being greater than said transverse cross member dimension by a predetermined cross dimension gap, said leg dimension gap and said cross dimension gap being sufficiently great so that the connector positioned in the adjacent recesses permits limited rotational movement of one frame member with respect to an adjacent frame member within a plane defined by the adjacent end surface portions of the two end members while said connector firmly holds said end surface portions together, said limited rotational movement relieving any twisting stress generated along the individual frame members during insertion of said connector.

15. The connector as recited in claim 14, wherein said cross members each extend transversely in opposite directions from said leg member, whereby the connector has a generally "H" shaped configuration.

16. The connector as recited in claim 14, wherein said inner surface of each cross member includes a lower end which is slanted outwardly in a downward direction.

17. The connector as recited in claim 16, wherein lower surface portions of the two side surface portions of each cross member extend downwardly and toward one another at a slant.

18. The connector as recited in claim 17, wherein the leg member has a lower end portion which is spaced upwardly from lower end portions of the two cross members.

19. The connector as recited in claim 16, wherein the leg member has a lower end portion which is spaced upwardly from lower end portions of the two cross members.

20. The connector as recited in claim 14, wherein the leg member has a lower end portion which is spaced upwardly from lower end portions of the two cross members.

* * * * *